Patented May 12, 1942

2,282,702

UNITED STATES PATENT OFFICE 2,282,702

DIMETHYLENE QUATERNARY AMMONIUM SALTS

Louis H. Bock, Glenside, Pa., assignor to Röhm & Haas Company, Philadelphia, Pa.

No Drawing. Application March 30, 1940,
Serial No. 327,079

7 Claims. (Cl. 260—404)

This invention relates to quaternary ammonium compounds of the general formula

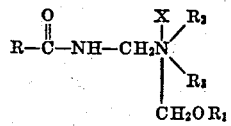

wherein R is an aliphatic group, $R_1$ is also an aliphatic group, X is a halogen, and $R_2$ and $R_3$ represent lower aliphatic groups when taken singly or, when taken together, represent a divalent aliphatic group which jointly with the nitrogen forms a heterocycle. These compounds are of marked reactivity, under proper conditions, toward such materials as starch, cellulose ethers, polyvinyl alcohol, cellulose, regenerated cellulose, etc. Yet they are sufficiently stable to allow application from aqueous baths. Hence, these new compounds are of value for fixation of sizes, plasticization of cellulose, waterproofing of fabrics, and similar applications.

The quarternary ammonium compounds of the above formula are prepared by reacting a disubstituted or tertiary aminomethyl amide with a halogenomethyl ether. The amide may be prepared by the condensation of an amide, formaldehyde, and a non-aromatic secondary amine, by the method shown in U. S. Patent No. 1,952,008. For this condensation any acid amide having a hydrogen on the amide nitrogen may be used. The aliphatic amides are preferred, such as acetamide, butyramide, undecylenamide, dodecylamide, oleylamide, stearamide, and mixed amides of acids from natural oils, such as cocoanut, olive, castor, rape seed, etc. They may contain in the acyl portion of their molecule such groups as aryl, alkoxy, halogeno-, keto-, etc.

The secondary amine is one in which the nitrogen is not linked directly to a phenyl or other aromatic group, but to an aliphatic or alicyclic group as in dimethylamine, diethylamine, diisopropylamine, methylpropylamine, diallylamine, morpholine, piperidine, methyl cyclohexylamine, methyl benzylamine, etc. The lower aliphatic amines (i. e. those having not more than eight carbon atoms) are preferred, but other strongly basic secondary amines are likewise useful, particularly those in which $R_2$ and $R_3$ together form a divalent, saturated group which with the nitrogen yields a heterocycle.

The halomethyl ether may be prepared according to the method shown in U. S. Patent No. 2,084,125 in which a primary or secondary alcohol, such as ethyl, isopropyl, n-butyl, isobutyl, amyl, allyl, methallyl, undecenyl, dodecyl, 9,10-octadecenyl, cetyl, octadecyl, benzyl, etc. alcohol or an alicyclic alcohol, such as cyclohexanol, and anhydrous formaldehyde, usually as paraformaldehyde, are reacted in a solvent with dry hydrogen chloride or bromide. These ethers are very unstable toward water, yet it has been found that they may be reacted with the aminomethyl amides to give relatively stable quaternary ammonium salts.

The halomethyl ether and the aminomethyl amide are reacted merely by mixing the two materials. The reaction is generally spontaneous. It is sometimes desirable to cool the reaction mixture to prevent too high temperatures. It is also sometimes advisable to warm the reaction mixture to complete the reaction. The reaction may, if desired, be carried out in a dry, inert solvent, such as benzene or toluene. The resulting quaternary ammonium compounds are, in general, soluble in water, unless both the chain from the amide and that from the ether are long.

The preparation of the new compounds is illustrated by the following examples.

Example 1

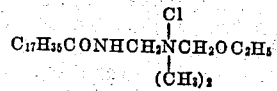

During a 30 minute period 95 parts of ethyl chloromethyl ether was added with stirring to 450 parts of dimethylaminomethyl stearamide maintained at 55° C. A stiff paste resulted which dissolved in water to form a viscous solution.

Example 2

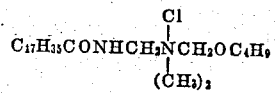

During the course of 30 minutes 120 parts of n-butyl chloromethyl ether was added with stirring to 450 parts of dimethyl aminomethyl stearamide maintained at 55° C. A stiff paste resulted which formed a viscous solution in water.

Example 3

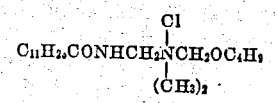

120 parts of n-butyl chloromethyl ether was added slowly with stirring to 250 parts of dimethylaminomethyl lauramide, keeping the temperature between 40° and 50° C. A viscous liquid resulted which formed a soapy solution in water.

*Example 4*

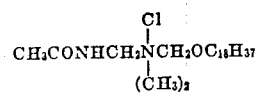

17 parts of dimethylaminomethyl acetamide was added slowly with stirring to 35.5 parts of octadecyl chloromethyl ether at 40–50° C. The resulting product was solid when cold. It formed a turbid solution in water.

*Example 5*

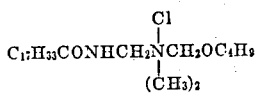

While the temperature was maintained at 40–50° C., 18 parts of butyl chloromethyl ether was added with stirring to 56 parts of dimethylaminomethyl oleylamide. The mixture was stirred for one hour and then cooled. It forms a thick paste which gave a soapy solution in water.

*Example 6*

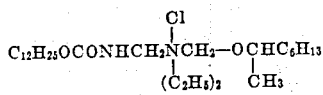

While the temperature was maintained between 40–50° C., 18 parts of capryl chloromethyl ether was added with stirring to 25 parts of N-diethylaminomethyl dodecyl carbamate. A waxy product resulted which formed a soapy solution in water.

The compounds having a chain of 12 or more carbon atoms, as shown, for example, in Examples 1 and 4 above, are particularly effective for the waterproofing of fabric. They are effective on cotton, linen, regenerated cellulose, jute, straw, silk, wool, etc., which may be impregnated with a solution containing such a compound, dried, and then heated. A temperature as low as 90° C. is effective. At the low temperatures at which the above compounds become effective there is no damage to even the most delicate fibers or fabrics. Typical applications in waterproofing are shown in the following examples.

(A) Cotton sheeting was dipped in a 3% solution of the compound obtained in Example 1 above. The material was dried in a current of air at about 40° C. and then placed in an oven at 110° C. for 30 minutes. The cloth was very water-repellent and this property was enhanced by rinsing in hot water. Laundering did not remove the water-repellent property.

(B) A spun viscose rayon fabric was dipped in a warm 5% solution of the compound prepared in Example No. 2. It was dried at room temperature and then heated 10 minutes at 135° C. in an oven. Good water-repellency was obtained.

(C) Cotton sheeting was dipped in a 5% solution of the compound prepared in Example No. 4. It was baked in an oven at 120° C. for 30 minutes. The resulting material was very water-repellent, even after laundering.

The long-chained compounds are also useful as softening agents and may be so used without heating or, if desired, fabric softened therewith may be heated to make this effect permanent.

Another use for the compounds is in the fixation of hydroxyl-containing sizes such as starch, cellulose ethers, and polyvinyl alcohol. These materials readily react with any of the above quaternary compounds and for sized fabrics, where a certain amount of crispness is desired, the short-chained derivatives, such as butyramidomethyl caproxymethyl dimethyl ammonium chloride, are of particular interest. If a long chain is present, there is softening as well as insolubilizing of the size. The new dimethylene quaternary ammonium compounds are particularly effective because both the acyl group and the ether group react.

Long-chained quaternary compounds of this invention are further useful as wetting, emulsifying, and dispersing agents.

I claim:

1. The process of preparing a compound of the formula

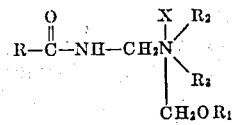

wherein R and R₁ represent aliphatic groups, X represents a halogen, and R₂ and R₃ represent a member of the group consisting of lower aliphatic groups and divalent saturated groups which jointly with the nitrogen form a heterocycle, which comprises mixing a tertiary aminomethyl amide and a halomethyl ether of an alcohol selected from a member of the group consisting of primary and secondary alcohols.

2. A compound of the formula

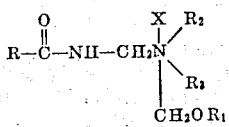

wherein R and R₁ represent aliphatic groups, X represents a halogen, and R₂ and R₃ represent a member of the group consisting of lower aliphatic groups and divalent saturated groups which jointly with the nitrogen form a heterocycle.

3. A compound of the formula

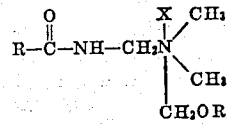

wherein R and R₁ represent aliphatic groups and X represents a halogen.

4. A compound of the formula

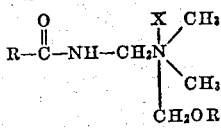

wherein R and R₁ are aliphatic hydrocarbon groups, one of which contains at least twelve carbon atoms and X represents a halogen.

5. Stearamidomethyl ethoxymethyl dimethyl ammonium chloride.

6. Stearamidomethyl butoxymethyl dimethyl ammonium chloride.

7. Butyramidomethyl caproxymethyl dimethyl ammonium chloride.

LOUIS H. BOCK.